(12) United States Patent
Hamada

(10) Patent No.: US 7,970,243 B2
(45) Date of Patent: Jun. 28, 2011

(54) OPTICAL DEVICE, OPTICAL COUPLER AND INTEGRATED CIRCUIT

(75) Inventor: Hidenobu Hamada, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/336,627

(22) Filed: Dec. 17, 2008

(65) Prior Publication Data

US 2009/0162007 A1    Jun. 25, 2009

(30) Foreign Application Priority Data

Dec. 21, 2007  (JP) .................. 2007-330469

(51) Int. Cl.
    *G02B 6/26*    (2006.01)
(52) U.S. Cl. ......................... 385/28; 385/132
(58) Field of Classification Search .............. 385/28, 385/29, 46, 129–132
    See application file for complete search history.

(56) References Cited

U.S. PATENT DOCUMENTS

| | | | | |
|---|---|---|---|---|
| 3,923,377 A | * | 12/1975 | Milton | 385/29 |
| 6,061,481 A | * | 5/2000 | Heidrich et al. | 385/14 |
| 6,580,850 B1 | * | 6/2003 | Kazarinov et al. | 385/28 |
| 6,594,297 B1 | | 7/2003 | Hayakawa | |
| 2007/0122081 A1 | * | 5/2007 | Doerr | 385/46 |

FOREIGN PATENT DOCUMENTS

| | | |
|---|---|---|
| JP | 57-157209 A | 9/1982 |
| JP | 2001-148536 A | 5/2001 |

OTHER PUBLICATIONS

Carmen Vazquez et al., "Experimental assessment of access guide first-order mode effect on multimode interference couplers", Optical Engineering, vol. 40, No. 7, Jul. 2001, pp. 1160-1162, 2001 Society of Photo-Optical Instrumentation Engineers, Spain.

* cited by examiner

*Primary Examiner* — Charlie Peng
(74) *Attorney, Agent, or Firm* — RatnerPrestia

(57) ABSTRACT

The present invention provides an MMI optical device that can prevent a possible decrease in transmission rate in spite of miniaturization and integration. The optical device includes a rectangular multimode waveguide and an electromagnetic wave absorber of a light source wavelength. The electromagnetic wave absorber is located on at least one side surface of the rectangular multimode waveguide and is located at a predetermined gap from a core of the rectangular multimode waveguide.

5 Claims, 12 Drawing Sheets

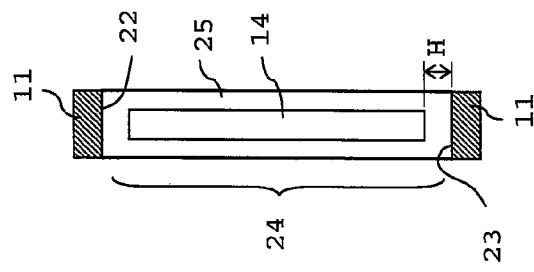
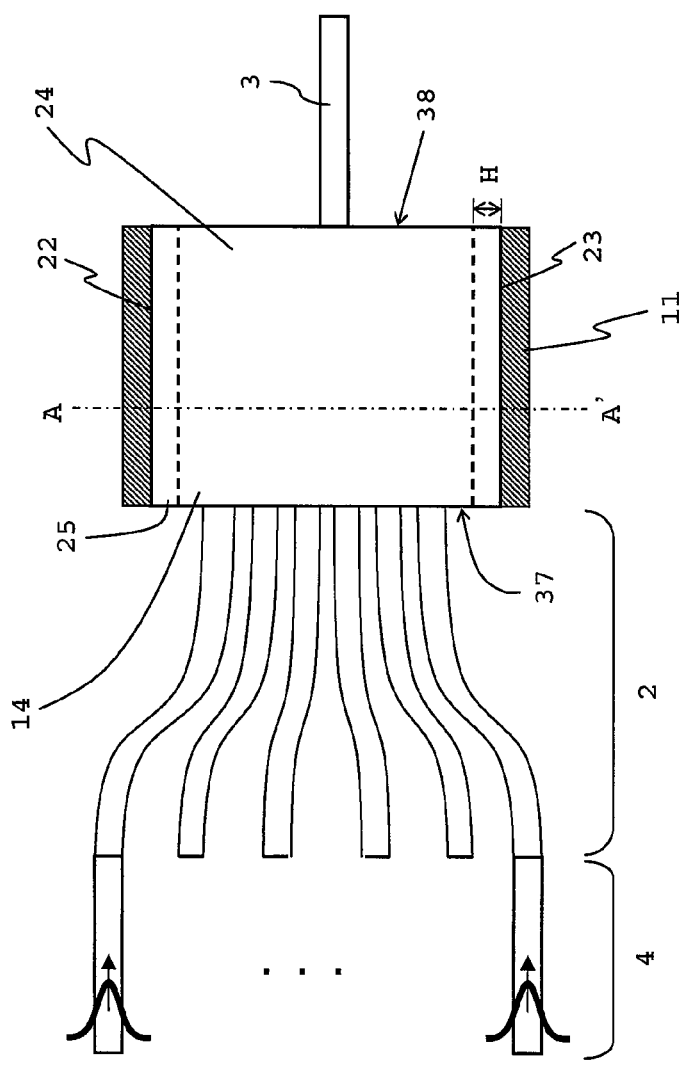

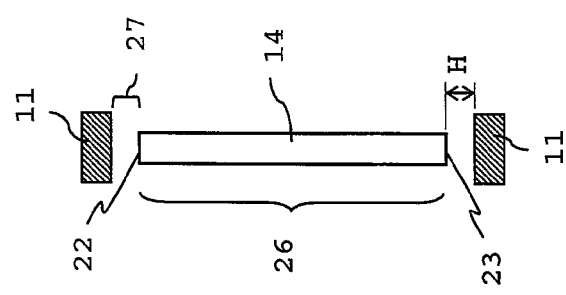
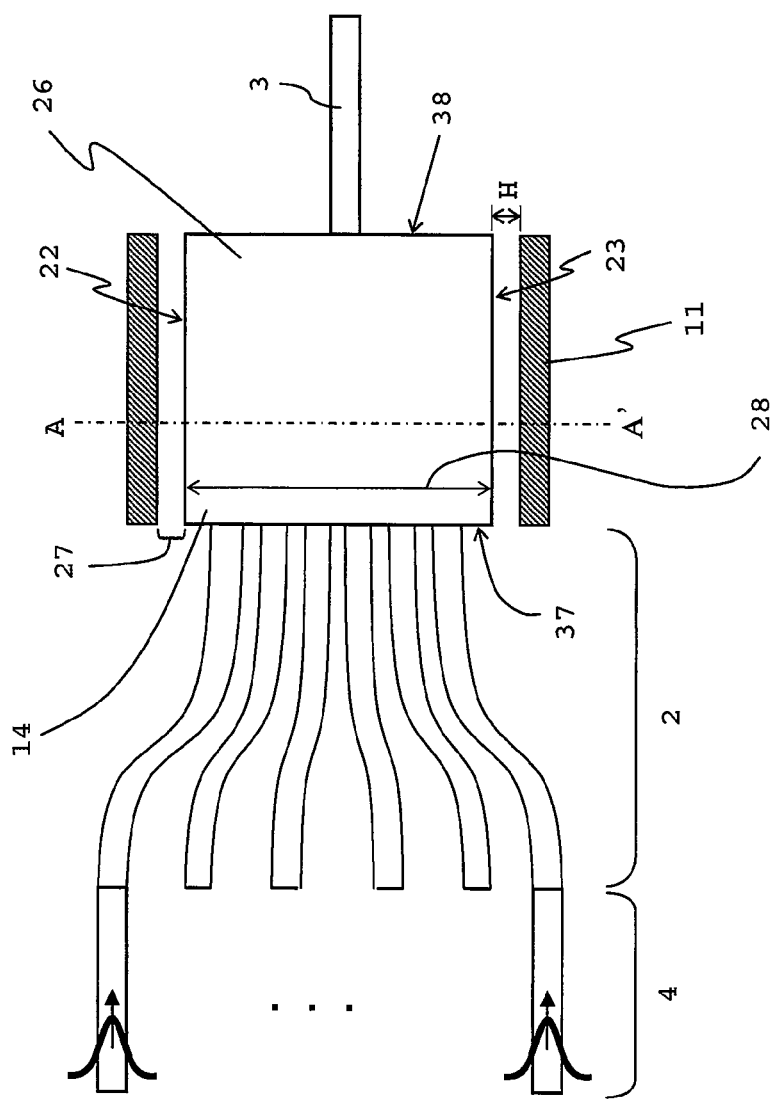

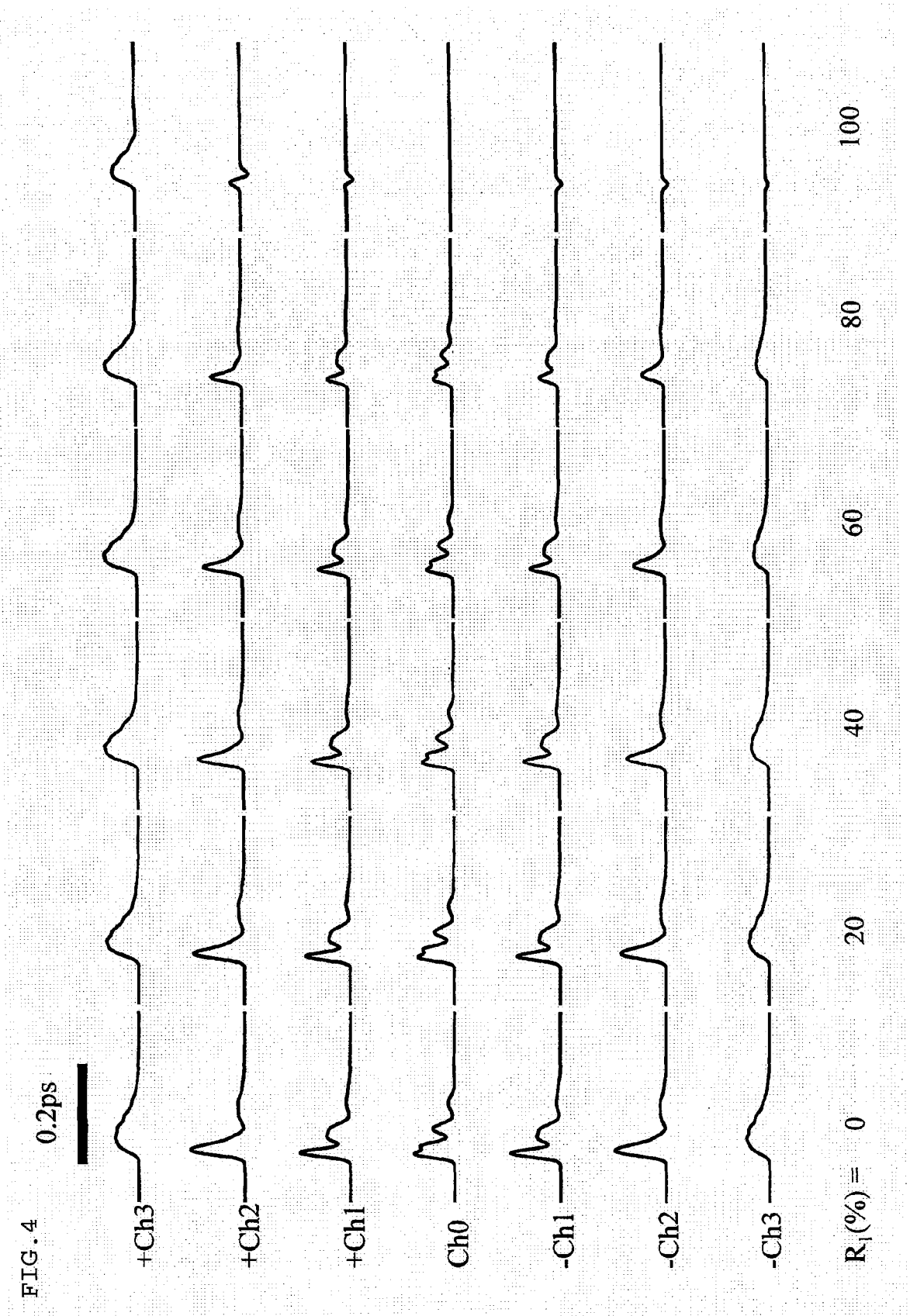

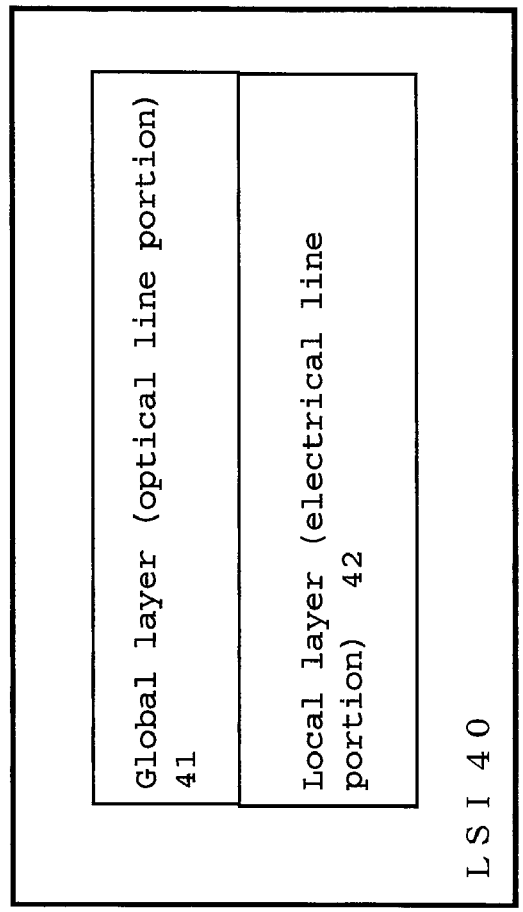
FIG.10(b) sectional view
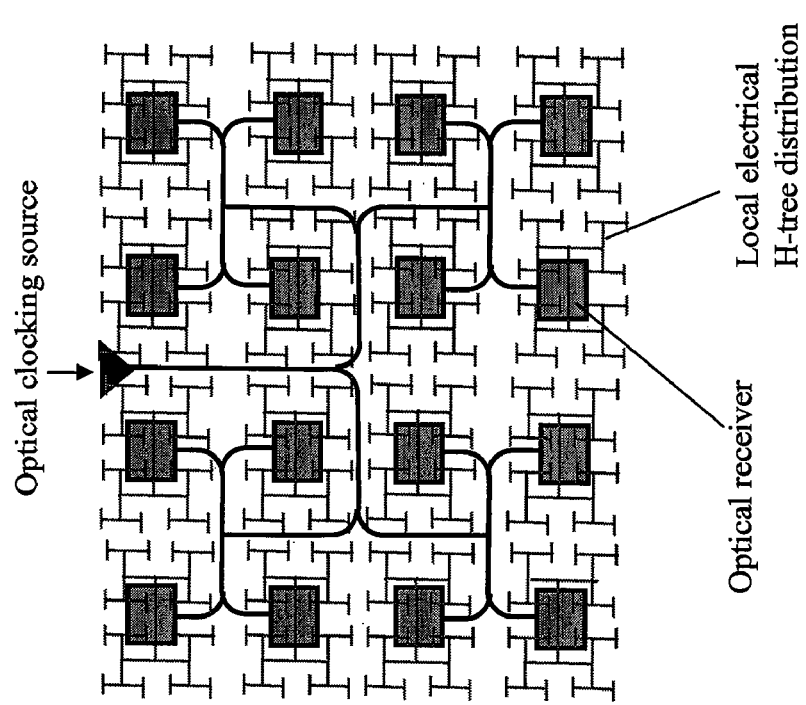
FIG.10(a) top view

OPTICAL DEVICE, OPTICAL COUPLER AND INTEGRATED CIRCUIT

BACKGROUND OF THE INVENTION

1. Field of the Invention

The present invention relates to an optical device, and an optical circuit or an optical coupler which use the optical device, and integrated circuit comprising the optical circuit. For example, the present invention relates to an optical device used for an optical circuit or an optical coupler utilizing multimode interference.

2. Related Art of the Invention

A self imaging phenomenon of multimode interference (MMI) in a rectangular multimode waveguide involves a reduced loss, is suitable for miniaturization, and allows easy processing. Thus, the rectangular multimode waveguide is utilized as an optical circuit and an optical coupler for an optical multiplexer and demultiplexer.

With an increased demand for communication, there has been an increased requirement not only for an increase in the transmission rate and channel number of optical devices but also for miniaturization and integration thereof.

However, a rectangular multimode waveguide with a reduced size and multiple channels for input and output offer an increased number of high-order modes and an increased pulse width spread. This disadvantageously prevents efficient transmission.

That is, mode group delay dispersion in the rectangular multimode waveguide causes a group delay difference between modes such that the group delay increases consistently with the order of the mode, that is, from low-order mode to high-order mode. Thus, an increase in the number of high-order modes increases the pulse width spread, caused by the group delay difference. Transmission rate is limited by the pulse width spread. Consequently, the increased number of high-order modes prevents efficient transmission.

Now, with reference to FIG. 11, a mechanism will be described about the problem of the increased the number of high-order modes. FIG. 11 shows a schematic diagram of a conventional rectangular multimode waveguide with multiple channels.

In FIG. 11, a plurality of input side single-mode waveguides 32 arranged in parallel so as to correspond to the multiple channels are connected to an input facet of a conventional rectangular multimode waveguide 31 so that connection positions are arranged on the input facet of the rectangular multimode waveguide 31 in a width direction thereof. An external light source 34 is connected to each of the input side single-mode waveguide 32. An output side single-mode waveguide 33 is connected to a width-wise central position of an output facet of the rectangular multimode waveguide 31.

For example, on the rectangular multimode waveguide 31 in FIG. 11, the lights inputted from the input side single-mode waveguide 32 interfere with each other, in other words high-order modes generated, and coupled. The coupled light is output from the output side single-mode waveguide 33. However unnecessary high-order modes are generated at the same time. In the case of the input side single-mode waveguide 32 are six as FIG. 11, 6th-order mode and lower order mode than 6th-order mode are necessary for the inputted lights coupled. However 7th-order mode and higher order modes than 7th-order mode which are unnecessary for coupling are generated at the time. When the unnecessary high-order modes are generated, the width of the pulse of the light outputted from the output side single-mode waveguide 33 is spread. Even if the 1st-order mode is not mixing on the input side single-mode waveguide 32 and only the 0th-mode is inputted to the rectangular multimode waveguide 31, the unnecessary high-order modes for coupling are generated.

Moreover for example, there is another problem that the unnecessary 1st-order mode is generated on the input side single-mode waveguide 32 which 0-th order mode should input the rectangular multimode waveguide 31. The mechanism is also reported in C. Vazquez, C. Aramburu, M. Galarza, and M. Lopez-Amo, "Experimental assessment of access guide first-order mode effect on multimode interference couplers," Opt. Eng. 40(7), pp 1160-1162, 2001.

As shown in FIG. 11, really speaking, the distance between the plurality of input side single-mode waveguides 32, connected to the rectangular multimode waveguide 31, decreases with increasing number of channels and decreasing size of the waveguide. Thus, directional coupling 35 causes mode coupling between the adjacent input side single-mode waveguides 32 to generate the 1st-order mode.

When light from the external light source 34 enters the input side single-mode waveguide 32 and if off-axis incidence 36 occurs, the 1st-order mode is also generated. And, an increase in the number of channels increases the frequency with which the 1st-order mode is generated by the off-axis incidence 36. The 1st-order mode generated by the off-axis incidence 36 attenuates as the light propagates through the input side single-mode waveguide 32. However, owing to a reduced optical path length resulting from the reduced size of the device, the 1st-order mode enters the rectangular multimode waveguide 31 before being completely attenuated.

Thus, with the multiple channels, the directional coupling 35 and off-axis incidence 36 cause not only the 0th-order mode but also the 1st-order mode to be input to the rectangular multimode waveguide 31. As a result, this increases the number of high-order modes in the rectangular multimode waveguide 31.

As described above, there are two problems. The 1st problem is that the unnecessary high-order modes are generated in the rectangular multimode waveguide 31, and the 2nd problem is that the unnecessary 1st-order mode is generated on the input side single-mode waveguide 32.

These two problems will be described below with reference to FIG. 12.

FIG. 12 shows output waveforms (waveform envelopes: theoretical calculation results, waveforms: FDTD (Finite-Difference Time-Domain) simulation results) observed in the rectangular multimode waveguide 31 under an MMI self imaging condition using a 1st-mode input light quantity rate ($R_1$) and input positions (Ch0, ±Ch1, ±Ch2, ±Ch3: Ch0 is the width-wise central position of the input facet of the rectangular multimode waveguide 31) as variables. A waveform shown at the top of FIG. 12 is an input waveform input to each of the channels. The attenuation indicated in the FDTD simulation results is faster than that indicated in the theoretical calculation results because a model that more significantly attenuates harmonic components with a more significant group delay in a propagation mode is used in order to reduce time for FDTD calculations and a load on a computer.

When you look at the case of that only 0th-order mode is inputted and 1st-order mode is not inputted (the case of "$R_1=0$") with reference to FIG. 12, you will be recognize that the output waveform spreads corresponding to the input waveform about the light inputted to any position. This is the pulse width spread caused by the unnecessary high-order modes generated in the rectangular multimode waveguide 31.

Furthermore, the multiple channels and the miniaturization and integration reduce the diameter of the core of the input side single-mode waveguide 32, connected to the rectangular multimode waveguide 31, while increasing the number of inputs provided closer to width-wise ends of the input facet of the rectangular multimode waveguide 31. This also increases the number of unnecessary high-order modes in the rectangular multimode waveguide 31.

Furthermore, if you look at different output waveforms of the 1st-mode input light quantity rate ($R_1$) with reference to FIG. 12, you will be recognize that the input of the 1st-order mode to the rectangular multimode waveguide 31 laterally unbalances the MMI to cause an output variation, further increasing the pulse width spread. The variation of the output waveforms with the 1st-mode input is caused by the unnecessary 1st-order mode generated on the input side single-mode waveguide 32.

In view of the above-described conventional problems, an object of the present invention is to provide an optical device, an optical coupler and an integrated circuit that enable a reduction in the pulse width spread caused by the mode group delay dispersion in spite of multiple channels and the reduced size of the device.

SUMMARY OF THE INVENTION

The 1$^{st}$ aspect of the present invention is an optical device comprising:
a rectangular multimode waveguide; and
an electromagnetic wave absorber of a light source wavelength, which is located on at least one side surface of the rectangular multimode waveguide and is located at a predetermined gap from a core of the rectangular multimode waveguide.

The 2$^{nd}$ aspect of the present invention is the optical device according to the 1$^{st}$ aspect of the present invention, wherein
the predetermined gap is longer than an effective depth of penetration of the core field into the cladding, from the core, of a light having a first predetermined order of eigenmode and is shorter than the effective depth of penetration of the core field into the cladding, from the core, of a light having a second predetermined order of eigenmode, the second predetermined order being larger than the first predetermined order by one.

The 3$^{rd}$ aspect of the present invention is the optical device according to the 2$^{nd}$ aspect of the present invention, wherein
the second predetermined order is an order of eigenmode of such light which is to be absorbed.

The 4$^{th}$ aspect of the present invention is the optical device according to the 1$^{st}$ aspect of the present invention, wherein
the rectangular multimode waveguide has the core and a clad provided on the core,
the electromagnetic wave absorber is provided on a surface of the clad, and
the predetermined gap is thickness of the clad.

The 5$^{th}$ aspect of the present invention is the optical device according to the 1$^{st}$ aspect of the present invention, wherein
each connection portion of a plurality of single mode waveguides is connected to an input edge of the core of the rectangular multimode waveguide in a width direction thereof.

The 6$^{th}$ aspect of the present invention is the optical device according to the 1$^{st}$ aspect of the present invention, wherein
the electromagnetic wave absorber is
any one material or any combination of materials selected from the group consisting of gold, silver, copper, aluminum, organic matter having lattice structure (O—H coupling) resonating at infrared region, transition metals having transition level at wavelength band to be used, and iron compound having transition level at wavelength band to be used.

The 7$^{th}$ aspect of the present invention is the optical device according to the 1$^{st}$ aspect of the present invention, wherein
the electromagnetic wave absorber is aluminum, and
the predetermined gap is 2.2% of the width direction length of the input edge of the core of the rectangular multimode waveguide.

The 8$^{th}$ aspect of the present invention is an optical device comprising:
a rectangular multimode waveguide; and
an optical filter waveguide having a periodic structure in a propagation direction of a light of the rectangular multimode waveguide and being located on at least one side surface of the rectangular multimode waveguide, with a predetermined gap from a core of the rectangular multimode waveguide.

The 9$^{th}$ aspect of the present invention is the optical device according to the 8$^{th}$ aspect of the present invention, wherein
the predetermined gap is shorter than an effective depth of penetration of the core field into the cladding, from the core, of a light having a predetermined order of eigenmode.

The 10$^{th}$ aspect of the present invention is the optical device according to the 9$^{th}$ aspect of the present invention, wherein
the predetermined order is an order of eigenmode of such light which is to be transferred, and
the period of the periodic structure is corresponding to the order of eigenmode of the light which is to be transferred.

The 11$^{th}$ aspect of the present invention is the optical device according to the 10$^{th}$ aspect of the present invention, wherein
when the period of the periodic structure is λ, the diffraction grating wave number calculated from the period λ is G, the propagation constant of the optical filter waveguide is $\beta_f$, the predetermined order is p, and the propagation constant of the pth-order component corresponding to the predetermined order p is as $\beta_p$,
the period λ satisfies the following Formula 3.

$$|\beta_f - \beta_p| = \frac{2\pi}{\lambda} = G \qquad \text{[Formula 3]}$$

The 12$^{th}$ aspect of the present invention is the optical device according to the 8$^{th}$ aspect of the present invention, wherein
a gap between a portion of the optical filter waveguide other than a portion of the optical filter waveguide which is opposite to the rectangular multimode waveguide and a plane containing the side surface of the rectangular multimode waveguide is larger than an gap between the portion which is opposite to the rectangular multimode waveguide and the side surface of the rectangular multimode waveguide.

The 13$^{th}$ aspect of the present invention is the optical device according to the 8$^{th}$ aspect of the present invention, wherein
each connection portion of a plurality of single mode waveguides is connected to an input edge of the core of the rectangular multimode waveguide in a width direction thereof.

The 14$^{th}$ aspect of the present invention is an optical device comprising:
a rectangular multimode waveguide; and
a plurality of single mode waveguides, wherein
each connection portion of the plurality of single mode waveguides is connected to an input edge of the core of the rectangular multimode waveguide in a width direction thereof, and
the plurality of single mode waveguides include such single mode waveguides arranged so as to include a section in which a distance between the adjacent single mode waveguides is equal to or shorter than a distance at which mode coupling occurs, and length of the section in a direction of an optical path is an integral multiple of such length that a phase difference between the 0th-order eigenmode and the 1st-order eigenmode which are excited in the two adjacent single mode waveguides, is $2\pi$.

The 15th aspect of the present invention is an optical device comprising:

a rectangular multimode waveguide; and a plurality of single mode waveguides, wherein each connection portion of the plurality of single mode waveguides is connected to an input edge of the core of the rectangular multimode waveguide in a width direction thereof, and a section in which light having the 1st-order eigenmode is attenuated is provided in a part of at least any of the plurality of single mode waveguides.

The 16th aspect of the present invention is the optical device according to the 15th aspect of the present invention, wherein a cross section of a core in the section in which the light of the 1st-order eigenmode is attenuated, is smaller than that in portions preceding and succeeding the section, and size of the cross section of the core in the section is sufficient to inhibit passage of the light of the 1st-order eigenmode.

The 17th aspect of the present invention is the optical device according to the 15th aspect of the present invention, wherein a difference in refractive index between the core and a clad in the section in which the light of the 1st-order eigenmode is attenuated, is smaller than that in portions preceding and succeeding the section, and the difference in refractive index in the section is small enough to prevent generation of the light of the 1st-order eigenmode.

The 18th aspect of the present invention is an optical coupler, comprising;

the optical device according to the 1st aspect of the present invention, an input waveguide part connected to the optical device to supply light therein, and an output waveguide part connected to the optical device to output coupled or divided light.

The 19th aspect of the present invention is an optical coupler, comprising;

the optical device according to the 8th aspect of the present invention, an input waveguide part connected to the optical device to supply light therein, and an output waveguide part connected to the optical device to output coupled or divided light.

The 20th aspect of the present invention is an integrated circuit, wherein the optical device according to the 1st aspect of the present invention is provided as an optical line portion.

The 21th aspect of the present invention is an integrated circuit, wherein the optical device according to the 8th aspect of the present invention is provided as an optical line portion.

The 22nd aspect of the present invention is an integrated circuit, wherein the optical device according to the 14th aspect of the present invention is provided as an optical line portion.

The 23rd aspect of the present invention is an integrated circuit, wherein the optical device according to the 15th aspect of the present invention is provided as an optical line portion.

The present invention can provide an optical device, an optical coupler and an integrated circuit that enables a reduction in the pulse width spread caused by the mode group delay dispersion in spite of multiple channels and the reduced size of the device.

BRIEF DESCRIPTION OF THE DRAWINGS

FIG. 2(A) is a schematic diagram of an optical device of other constitution according to Embodiment 1 of the present invention;

FIG. 2(B) is a sectional view of the optical device of other constitution according to Embodiment 1 of the present invention, the sectional view being taken along line A-A' in FIG. 2(A);

FIG. 3(A) is a schematic diagram of an optical device of the constitution to use air as clad according to Embodiment 1 of the present invention;

FIG. 3(B) is a sectional view of the optical device of the constitution to use air as clad according to Embodiment 1 of the present invention, the sectional view being taken along line A-A' in FIG. 3(A);

FIG. 4 is a diagram showing a relationship between a 1st-order mode input and a change of output waveforms in the optical device of the constitution to use air as clad according to Embodiment 1 of the present invention;

FIG. 10(A) is a top view of an integrated circuit according to Embodiment 5 of the present invention;

FIG. 10(B) is a sectional view of the side of an integrated circuit according to Embodiment 5 of the present invention;

DESCRIPTION OF SYMBOLS

Figure 1B:
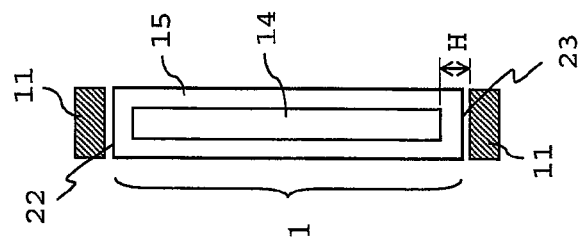
FIG. 1(B) is a sectional view of the optical device according to Embodiment 1 of the present invention, the sectional view being taken along line A-A' in FIG. 1(A)

1 Rectangular multimode waveguide
2, 19, 20, 21 Input side single-mode waveguides
3 Output side single-mode waveguide
4 External light source
5 0th-order mode (directional coupling section)
6 1st-order mode (directional coupling section)
7 Directional coupling section 8 0th-order mode
9 1st-order mode (resulting from off-axis)
10 Narrow portion
11 Electromagnetic wave absorber
12 Harmonic filter waveguide
13 Long-period diffraction grating
14 Core portion
15 Clad portion
16 0th-order mode
17 To-be-absorbed high-order mode
18 0th-order mode (harmonic filter waveguide)
22, 23 Side surface
24 Rectangular multimode waveguide
25 Clad portion
26 Rectangular multimode waveguide
27 Clad portion (Air)
28 Width of multimode waveguide
30 Portion facing side surface of rectangular multimode waveguide
35 Directional coupling
36 Off axis
37 Input facet
38 Output facet
39 Portion of small difference in refractive index
40 LSI
41 Global layer (optical line portion)
42 Local layer (electrical line portion)

PREFERRED EMBODIMENTS OF THE INVENTION

Embodiments of the present invention will be described below with reference to the drawings.

Embodiment 1

Figure 1A:
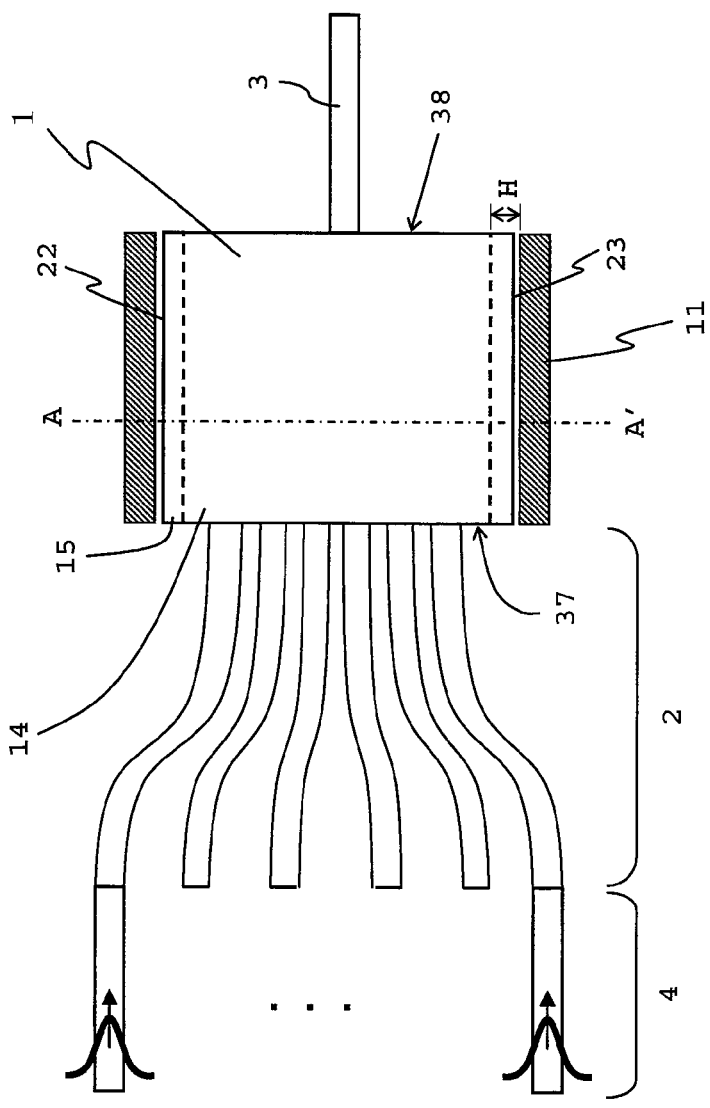
FIG. 1(A) is a schematic diagram of an optical device according to Embodiment 1 of the present invention.

FIG. 1(A) shows a schematic diagram of an optical device according to Embodiment 1 of the present invention. FIG. 1(B) shows a sectional view of a rectangular multimode waveguide portion shown in FIG. 1(A), the sectional view being taken along line A-A'.

As shown in FIG. 1(A), in the optical device according to Embodiment 1, a plurality of input side single-mode waveguides 2 arranged in parallel so as to correspond to multiple channels are arranged on an input facet 37 of a rectangular multimode waveguide 1 so that connection positions are arranged on the input facet 37 of the rectangular multimode waveguide 1 in a width direction thereof. An external light source 4 is connected to each of the input side single-mode waveguides 2. An output side single-mode waveguide 3 is connected to a width-wise central position of an output facet 38 of the rectangular multimode waveguide 1. The external light source 4 is, for example, a transmission path such as optical fibers.

An electromagnetic wave absorber 11 is provided close to each side surface 22 and 23 of the rectangular multimode waveguide 1 which extends along an optical path. As shown in FIG. 1(B), the rectangular multimode waveguide 1 is composed of a core portion 14 and a clad portion 15 surrounding the core portion 14. The electromagnetic wave absorber 11 is located such that a distance H from the core portion 14 of the rectangular multimode waveguide 1 is equal to or shorter than an effective depth of penetration of the core field into the cladding of a high-order mode from the core portion 14.

The input side single-mode waveguides 2 corresponds to an example of an input waveguide part according to the present invention. The output side single-mode waveguide 3 corresponds to an example of an output waveguide part according to the present invention. The part of the core portion 14 among the input facet 37 corresponds to an example of an input edge of the core according to the present invention. The distance H between the electromagnetic wave absorber 11 and the core portion 14 of the rectangular multimode waveguide 1 corresponds to an example of a predetermined gap according to the present invention.

The effective depth of penetration of the core field into the cladding of an eigenmode of a multimode waveguide from a core thereof can be expressed by the reciprocal of an attenuation constant $\gamma_2$ for a clad. The attenuation constant $\gamma_2$ for the clad is determined by Formula 1 (a momentum conservation law for the waveguide) and Formula 2 (a boundary condition). The value $\gamma_2$ decreases with increasing mode order p, that is, the effective depth of penetration of the core field into the cladding from the core increases consistently with the order of the mode.

In Formulae 1 and 2, $\kappa_1$: the wave number of the core in the width direction, $\in_1$ and $\in_2$: the dielectric constants of the core and the clad, $\mu_1$ and $\mu_2$: the magnetic permeability of the core and the clad, $\omega$: the frequency, and d: the diameter of the core.

$$k_1^2 + \gamma_2^2 = (\varepsilon_1\mu_1 - \varepsilon_2\mu_2)\omega^2 \qquad [\text{Formula 1}]$$

$$\gamma_2 d = \frac{\mu_2}{\mu_1} k_1 d \tan\left(\frac{k_1 d}{2} - \frac{p\pi}{2}\right) \qquad [\text{Formula 2}]$$

By placing the electromagnetic wave absorber at a distance from the core which is equal to or shorter than the effective depth of penetration of the core field into the cladding of a pth-order mode calculated by Formulae 1 and 2, high-order modes equal to or higher than the pth-order mode can be absorbed. Thus, the effect of high-order modes, which exhibit a significant group delay, can be reduced, thus enabling a reduction in pulse width spread.

For example, if light is input from each of six input side single-mode waveguides 2 as FIG. 1(A), it enough to couple these lights in the rectangular multimode waveguide 1 if there is at least 6th-order mode or higher-order mode than 6th-order, and if there is higher-order mode (The higher-mode is estimated roughly from the ratio of the width of the rectangular multimode waveguide to the width of the output side single-mode waveguide. For example, when the former value is 12 um and the latter value is 1.8 um, the higher-mode is 6th-mode.) that is possible to contribute to condense the diameter of the propagation beam to the degree of the diameter of mode field of the output side single-mode waveguide 3. If there is the higher-order mode, more highly-order mode is unnecessary.

Thus, in the optical device according to Embodiment 1, the electromagnetic wave absorber 11 is located such that the distance H from the core portion 14 of the rectangular multimode waveguide 1 to the electromagnetic wave absorber 11 is longer than the effective depth of penetration of the core field into the cladding of the 6th-order mode, and shorter than the effective depth of penetration of the core field into the cladding of the 7th-order mode of a light having.

As described above, to absorb only the high-order modes equal to or higher than the 7th-order mode by the electromagnetic wave absorber 11, the distance H from the core portion 14 of the rectangular multimode waveguide 1 to the electromagnetic wave absorber 11 is set to be longer than the effective depth of penetration of the core field into the cladding of the 6th-order mode and shorter than that of the 7th-order mode. This enables a reduction only in the high-order modes equal to or higher than the 7th-order mode.

The 6th-order mode to prevent from being absorbed by the electromagnetic wave absorber 11 in this case corresponds to an example of a first predetermined order of eigenmode according to the present invention. The 7th-order mode to absorb by the electromagnetic wave absorber 11 in this case corresponds to an example of a second predetermined order of eigenmode according to the present invention.

The amount of electromagnetic waves absorbed (the amount of high-order modes attenuated) depends on a propagation distance. Thus, as shown in FIG. 1(A), the electromagnetic wave absorber 11 can be effectively located over the waveguide length of the rectangular multimode waveguide 1.

In the above-described example of the optical device according to Embodiment 1, shown in FIGS. 1(A) and 1(B), the rectangular multimode waveguide 1 and the electromagnetic wave absorber 11 are arranged so as not to contact each other. However, the rectangular multimode waveguide 1 and the electromagnetic wave absorber 11 may be arranged in contact with each other.

FIG. 2(A) shows a schematic diagram of an optical device of other constitution according to Embodiment 1 of the present invention. FIG. 2(B) shows a sectional view of a rectangular multimode waveguide portion shown in FIG. 2(A), the sectional view being taken along line A-A'. The same components as those in FIG. 1(A) are denoted by the same reference numerals in FIGS. 2(A) and 2(B).

A clad portion 25 of the side of each side surface 22 and 23 of a rectangular multimode waveguide 24 shown in FIG. 2(A) is thicker than that of the rectangular multimode waveguide 1 shown in FIG. 1(A), and the thickness of the clad portion 25 is equal to the distance H.

In this case, the electromagnetic wave absorber 11 is located on each side surface 22 and 23 of the rectangular multimode waveguide 24. This is made that the distance from the core portion 14 of the rectangular multimode waveguide 24 to the electromagnetic wave absorber 11 is equal to the distance H.

Thus, this configuration enables that the distance H between the core portion 14 of the rectangular multimode waveguide 24 and the electromagnetic wave absorber 11 can be adjusted by the thickness of a clad portion 25 in a side surface portion of the rectangular multimode waveguide 24. This configuration enables a reduction in assembly error during production of the optical device according to Embodiment 1.

Furthermore, at the optical device described above in Embodiment 1, as shown in FIGS. 1(A) and 1(B), the rectangular multimode waveguide 1 is configured such that the clad portion 15 is provided around the core portion 14. However, the rectangular multimode waveguide may be composed only of the core portion 14, with surrounding air used as a clad portion.

FIG. 3(A) shows a schematic diagram of an optical device of other constitution according to Embodiment 1 of the present invention. This constitution has a structure that uses surrounding air as a clad portion. FIG. 3(B) shows a sectional view of a rectangular multimode waveguide portion shown in FIG. 3(A), the sectional view being taken along line A-A'. The same components as those in FIG. 1(A) are denoted by the same reference numerals in FIGS. 3(A) and 3(B).

A rectangular multimode waveguide 26 shown in FIG. 3(A) uses surrounding air as a clad portion 27 and be composed only of the core portion 14.

In this case, like the case of FIG. 1(A) or 2(A), the electromagnetic wave absorber 11 is located such that the distance from the core portion 14 of the rectangular multimode waveguide 26 to the electromagnetic wave absorber 11 is equal to the distance H. The electromagnetic wave absorber 11 is located such that the distance from each side surface 22 and 23 of the rectangular multimode waveguide 26 to the electromagnetic wave absorber 11 is equal to the distance H because of the rectangular multimode waveguide 26 is composed only of the core portion 14.

FIG. 4 shows theoretical calculation results (waveform envelopes) of output waveforms observed in the rectangular multimode waveguide 26 shown in FIG. 3(A) using a 1st-mode input light quantity rate ($R_1$) and input positions (Ch0, ±Ch1, ±Ch2, ±Ch3: Ch0 is the width-wise central position of the input facet 37 of the rectangular multimode waveguide 26) as variables.

The output waveforms is shown in FIG. 4 when using air as a clad portion 27 and the electromagnetic wave absorber 11 is located keep the distance of 2.2% of the width of multimode waveguide 28 from each side surface 22 and 23 of the rectangular multimode waveguide 26.

Figure 12:
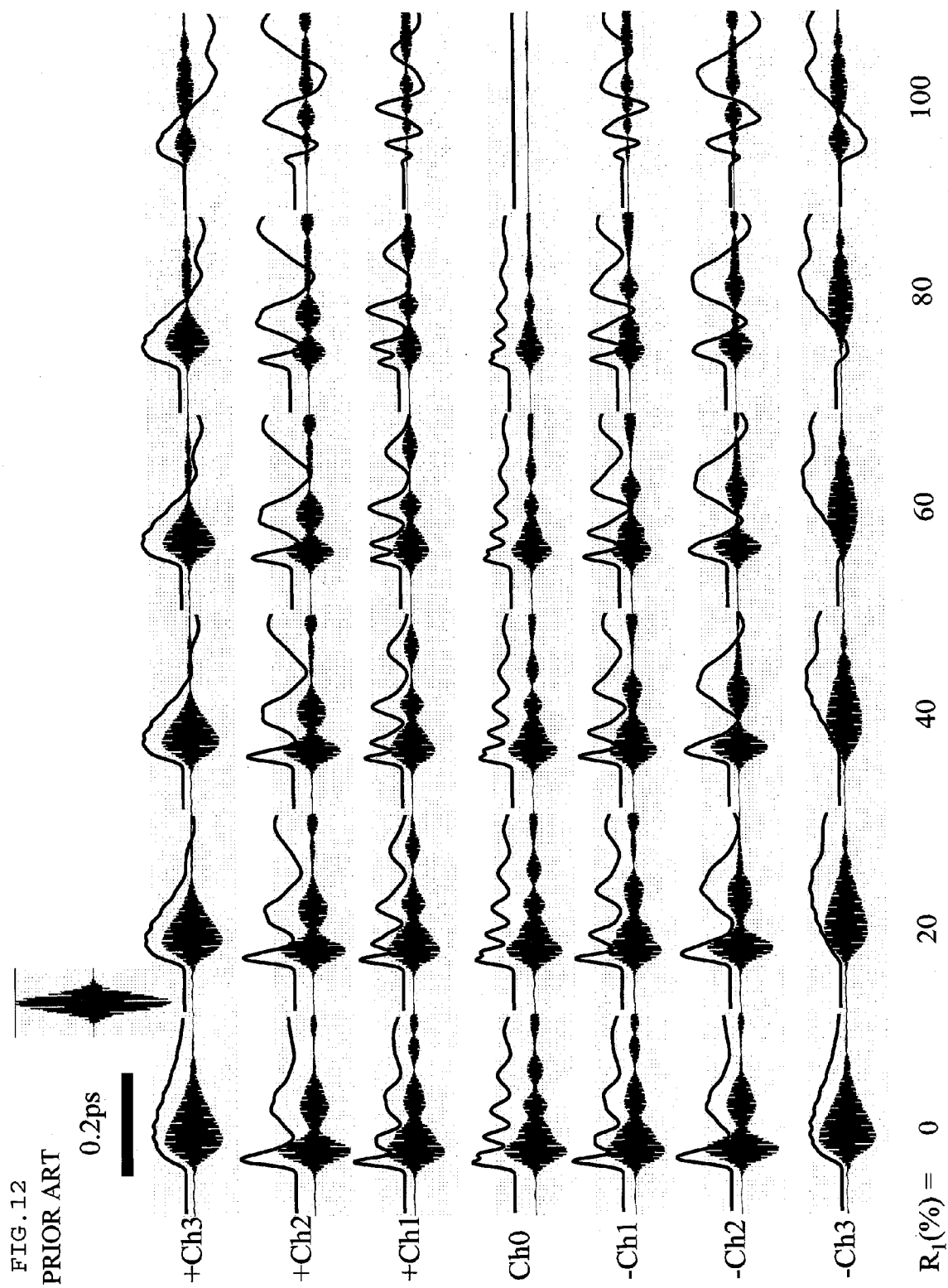
FIG. 12 is a diagram showing a relationship between a 1st-order mode input and a change of output waveforms in the rectangular multimode waveguide.

When you look at the case of that only 0th-order mode is inputted (the case of "$R_1=0$") with reference to FIG. 4, and compare with the output waveforms in FIG. 12 about the conventional constitution the electromagnetic wave absorber not contained, you will be recognize that the one where there is the electromagnetic wave absorber 11 can reduce the pulse width spread.

By providing the electromagnetic wave absorber 11, the unnecessary high-order modes for coupling which are generated in the rectangular multimode waveguide 26 are absorbed and reduced.

When you look at the case of that not only 0th-order mode but also 1st-order mode is inputted (the case of "$R_1=20\%$, 40%, 60%, 80%") with reference to FIG. 4, and compare with the output waveforms in FIG. 12, you will be recognize that the output variation depend on inputted 1st-order mode is smaller than conventional. By providing the electromagnetic wave absorber 11, the influence to spread the pulse width with inputted unnecessary 1st-order mode generated on the input side single-mode waveguide 2 is decreased.

Additionally, in Embodiment 1, as shown in FIGS. 1(A) and 1(B), the electromagnetic wave absorber 11 is located at each of the opposite side surfaces 22 and 23 of the rectangular multimode waveguide 1. This configuration effectively reduces the high-order modes, but the high-order modes can be reduced by providing the electromagnetic wave absorber 11 at only one of the side surfaces (for example, only the side surface 22) of the rectangular multimode waveguide 1.

It can be used anything having absorption characteristic at wavelength band to be used as materials of the electromagnetic wave absorber 11, for example, the metal which plasma frequency is smaller than the frequency of light wavelength band such as gold, silver, copper, and aluminum, organic matter having lattice structure (O—H coupling) resonating at infrared region, transition metals having transition level at wavelength band to be used, iron compound having transition level at wavelength band, and any combination selected from these materials. For example, the electromagnetic wave absorber 11 can be made of a material mixed any material of these. Moreover for example, the electromagnetic wave absorber 11 can be consisted plural parts that each of the part made of different material.

As described above, by controlling the distance, from the side surface of the core, of the electromagnetic wave absorber located along the side surface of the rectangular multimode waveguide, the high-order mode components, which exhibit a significant group delay, can be absorbed and removed. This enables a reduction in the pulse width spread resulting from mode group velocity dispersion.

Embodiment 2

Figure 5:
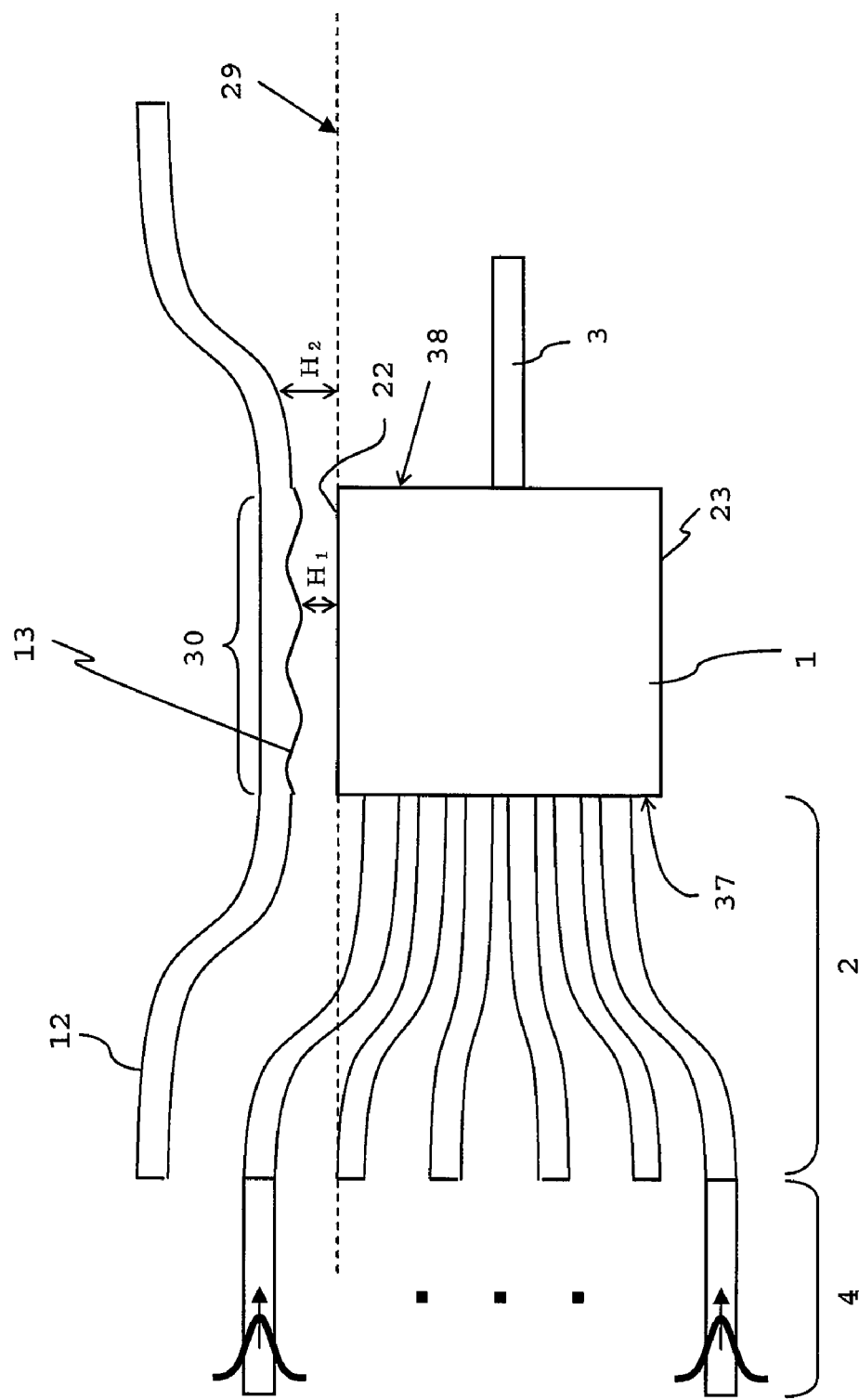
FIG. 5 is a schematic diagram of an optical device according to Embodiment 2 of the present invention.

FIG. 5 shows a schematic diagram of an optical device according to Embodiment 2 of the present invention. The same components as those in FIG. 1(A) are denoted by the same reference numerals.

In the optical device according to Embodiment 2, like the optical device according to Embodiment 1, shown in FIG. 1(A), the plurality of input side single-mode waveguides 2 arranged in parallel so as to correspond to multiple channels are arranged on the input facet 37 of the rectangular multimode waveguide 1 so that the connection positions are arranged on the input facet 37 of the rectangular multimode waveguide 1 in the width direction thereof. The external light source 4 is connected to each of the input side single-mode waveguides 2. The output side single-mode waveguide 3 is connected to the width-wise central position of the output facet 38 of the rectangular multimode waveguide 1.

In the optical device according to Embodiment 2, as shown in FIG. 5, a harmonic filter waveguide 12 is provided close to the side surface 22 of the rectangular multimode waveguide 1 along the optical path.

The harmonic filter waveguide 12 corresponds to an example of an optical filter waveguide according to the present invention. The side surface 22 of the side faced the harmonic filter waveguide 12 corresponds to an example of at least one side surface according to the present invention.

A portion 30 of the harmonic filter waveguide 12 which is close and face to the side surface 22 of the rectangular multimode waveguide 1 has a long-period diffraction grating 13 structure having, along a propagation direction, a wave number of the absolute value of a phase difference between an eigenmode and the high-order mode component of the rectangular multimode waveguide 1. A portion of the harmonic filter waveguide 12 which does not have the long-period diffraction grating 13 structure, that is, a portion which is not close to the side surface 22 of the rectangular multimode waveguide 1 is shaped and arranged such that the distance $H_2$ between this portion and a plane 29 containing the side surface 22 of the rectangular multimode waveguide 1 is longer than the distance $H_1$ between the portion 30 with the long-period diffraction grating 13 structure and the plane 29. That is, the harmonic filter waveguide 12 is located such that the portion thereof without the long-period diffraction grating 13 structure lies away from the plane 29 containing the side surface 22 of the rectangular multimode waveguide 1. Thus locating the harmonic filter waveguide 12 can prevent mode coupling to the input side single-mode waveguide 2 or the output side single-mode waveguide 3.

The plane 29 containing the side surface 22 of the rectangular multimode waveguide 1 shown by dashed line in FIG. 5 expresses a virtual plane containing the side surface 22.

Figure 6:
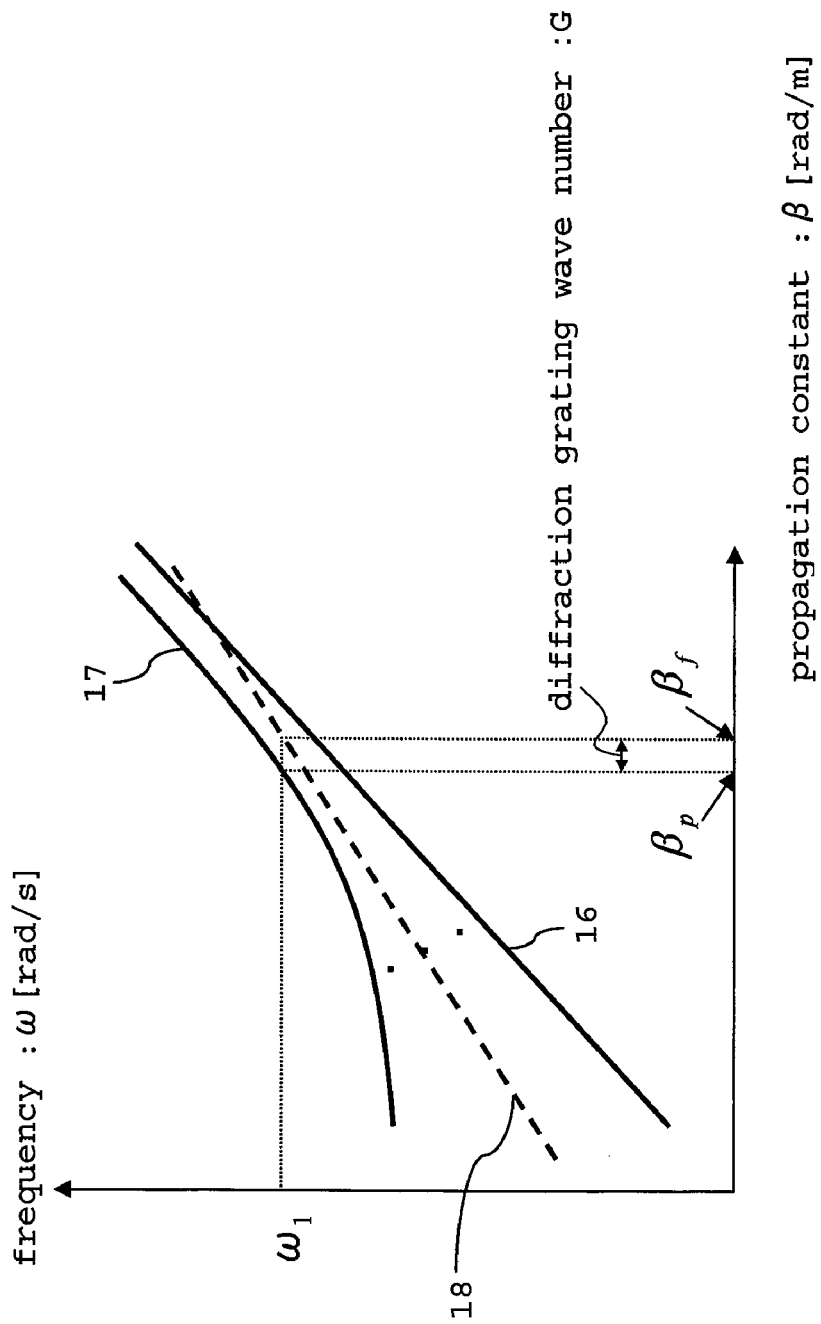
FIG. 6 is a diagram showing dispersion characteristics of a rectangular multimode waveguide and a harmonic filter waveguide in the optical device according to Embodiment 2 of the present invention.

FIG. 6 shows dispersion characteristics of the rectangular multimode waveguide 1 and harmonic filter waveguide 12 in the optical device according to Embodiment 2. Solid lines indicate the dispersion characteristics of a 0th-order mode 16 of the rectangular multimode waveguide 1 and of a high-order mode 17 to be absorbed (removed). A dashed line indicates the dispersion characteristics of a 0th-order mode 18 of the harmonic filter waveguide 12.

When the propagation constant of the harmonic filter waveguide 12 is defined as $\beta_f$ and the propagation constant of the pth-order component of the rectangular multimode waveguide 1 is defined as $\beta_p$, the pth-order component satisfying Formula 3 travels from the rectangular multimode waveguide 1 to the harmonic filter waveguide 12, in the long-period diffraction grating 13 portion (period: $\lambda$) of the harmonic filter waveguide 12. The pth-order component is then separated from the rectangular multimode waveguide 1. That is, the pth-order component is separated and removed from the rectangular multimode waveguide 1; the pth-order component has the propagation constant $\beta_p$ equal to the absolute value of the difference between a diffraction grating wave number G calculated from the period $\lambda$ of the long-period diffraction grating 13 portion of the harmonic filter waveguide 12 and the propagation constant $\beta_f$ of the harmonic filter waveguide 12.

$$|\beta_f - \beta_p| = \frac{2\pi}{\lambda} = G \qquad \text{[Formula 3]}$$

The distance $H_1$, from the portion 30 having the long-period diffraction grating 13 of the harmonic filter waveguide 12 which is close and faced to the side surface 22 of the rectangular multimode waveguide 1 to the side surface 22, is setting equal to or shorter than an effective depth of penetration of the core field into the cladding of a high-order to be absorbed (removed), like the optical device according to Embodiment 1. The distance $H_1$ from the portion 30 faced to the side surface 22 to the side surface 22 in this case corresponds to an example of a predetermined gap according to the present invention.

In the case of Embodiment 1, all order modes equal to or longer than a predetermined mode to be absorbed are absorbed. But in the case of Embodiment 2, only the predetermined mode to be absorbed is absorbed by select. In the case of Embodiment 2, only the pth-order mode having the propagation constant $\beta_p$ satisfying Formula 3 and approximate modes of the pth-order mode are absorbed. Then in the case of Embodiment 2, the harmonic filter waveguide 12 may be located the position that the distance $H_1$ from the portion 30 faced to the side surface 22 to the side surface 22 is shorter than an effective depth of penetration of the core field into the cladding of a low-order to be not absorbed (not removed).

The predetermined mode (pth-order mode) to be absorbed of Embodiment 2 corresponds to an example of a predetermined order of eigenmode according to the present invention. And the period $\lambda$ of the long-period diffraction grating 13 satisfying Formula 3 corresponds to an example of a period corresponding to the order of eigenmode of the light which is to be transferred according to the present invention.

The predetermined high-order mode to be absorbed are absorbed by select depend on the period of the long-period diffraction grating 13. Then, if you absorb plural order modes, the construction of the period of the long-period diffraction grating 13 may become the constitution combined periods corresponding to each high-order mode to be absorbed. For example, the period of the long-period diffraction grating 13 may be changing along the propagation direction of a light in the rectangular multimode waveguide 1. Moreover for example, the harmonic filter waveguide 12 may has a lattice structure having plural periods as the long-period diffraction grating 13.

In Embodiment 2, for easy-to-understand description, the harmonic filter waveguide 12 offers the single mode. However, if $\beta_f$ satisfying Formula 3 exists, the harmonic filter waveguide 12 may offer multiple modes.

In FIG. 5, for easy-to-understand description, the harmonic filter waveguide 12 is provided on only one side surface 22 of the rectangular multimode waveguide 1. However, the harmonic filter waveguide 12 may be provided on both side surfaces 22 and 23 of the rectangular multimode waveguide 1. In this case, more significant effects are exerted.

As described above, by locating the long-period diffraction grating close to and along the side surface of the rectangular multimode waveguide, the high-order mode components, which exhibit a significant group delay, can be absorbed and removed. This enables a reduction in the pulse width spread resulting from mode group velocity dispersion.

Embodiment 3

Figure 7:
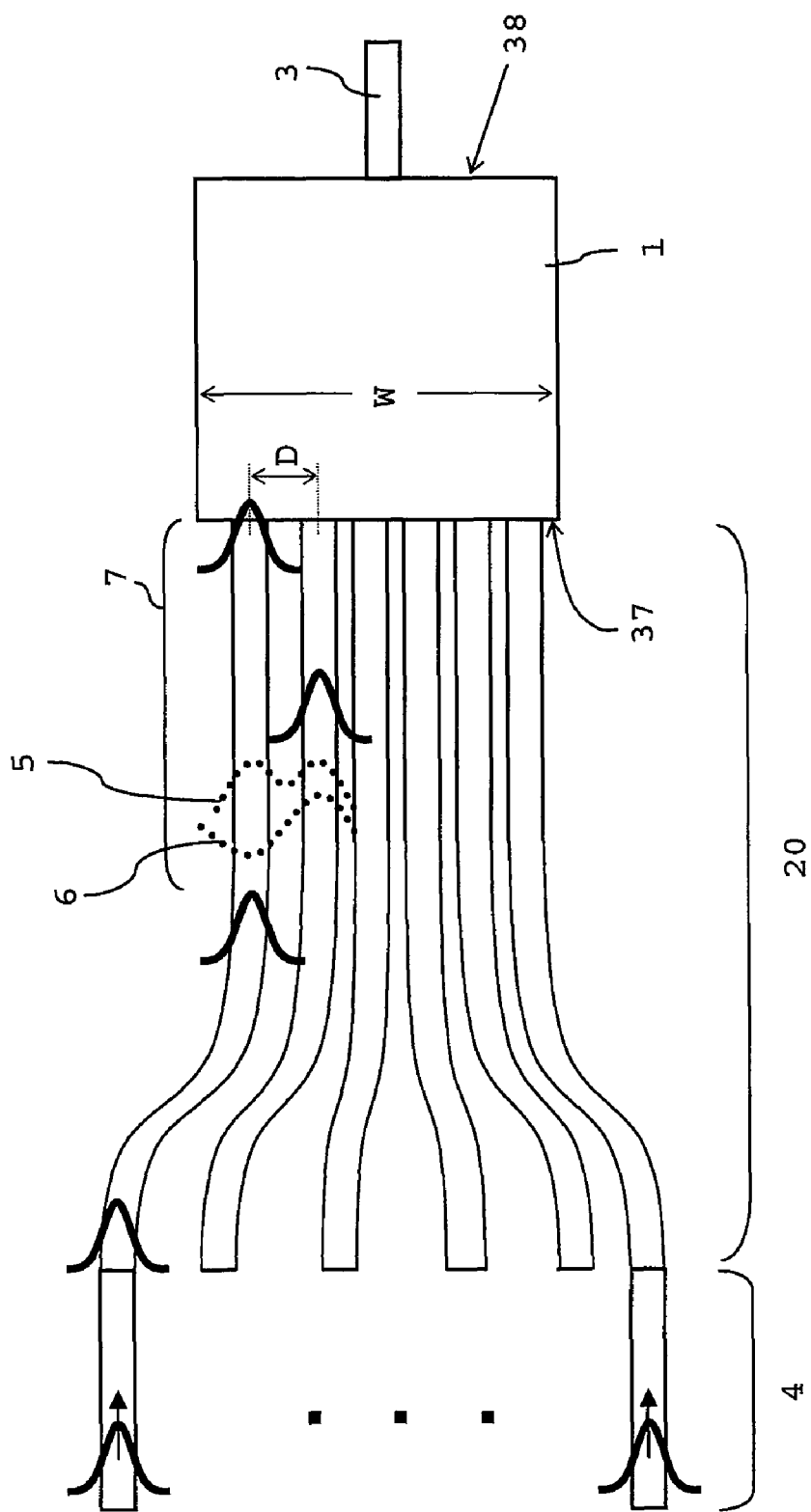
FIG. 7 is a schematic diagram of an optical device according to Embodiment 3 of the present invention.

FIG. 7 shows a schematic diagram of an optical device according to Embodiment 3 of the present invention. The same components as those in FIG. 1 are denoted by the same reference numerals.

In the optical device according to Embodiment 3, like the optical device according to Embodiment 1, shown in FIG. 1(A), the plurality of input side single-mode waveguides 20 arranged in parallel so as to correspond to multiple channels are arranged on the input facet 37 of the rectangular multimode waveguide 1 so that the connection positions are arranged on the input facet 37 of the rectangular multimode waveguide 1 in the width direction thereof. The external light source 4 is connected to each of the input side single-mode waveguides 20. The output side single-mode waveguide 3 is connected to the width-wise central position of the output facet 38 of the rectangular multimode waveguide 1.

Here, in each of the plurality of input side single-mode waveguides 20 according to Embodiment 3, a directional coupling section 7 in which two adjacent input side single-mode waveguides 20 lie close to each other to the degree that the waveguides 20 are subjected to mode coupling has an optical path length such that a phase difference of $2\pi$ occurs between the 0th-order eigenmode 5 and the 1st-order eigenmode 6 excited in the two adjacent input side single-mode waveguides. In the directional coupling section 7, the input side single-mode waveguides 20 are arranged parallel to each other.

If the two adjacent input side single-mode waveguides 20 are subjected to mode coupling, the distance between the two input side single-mode waveguides 20 depends on the effective depth of penetration of the core field into the cladding from the core. Thus, the distance can be calculated by determining the specific configuration of the optical device.

Figure 11:
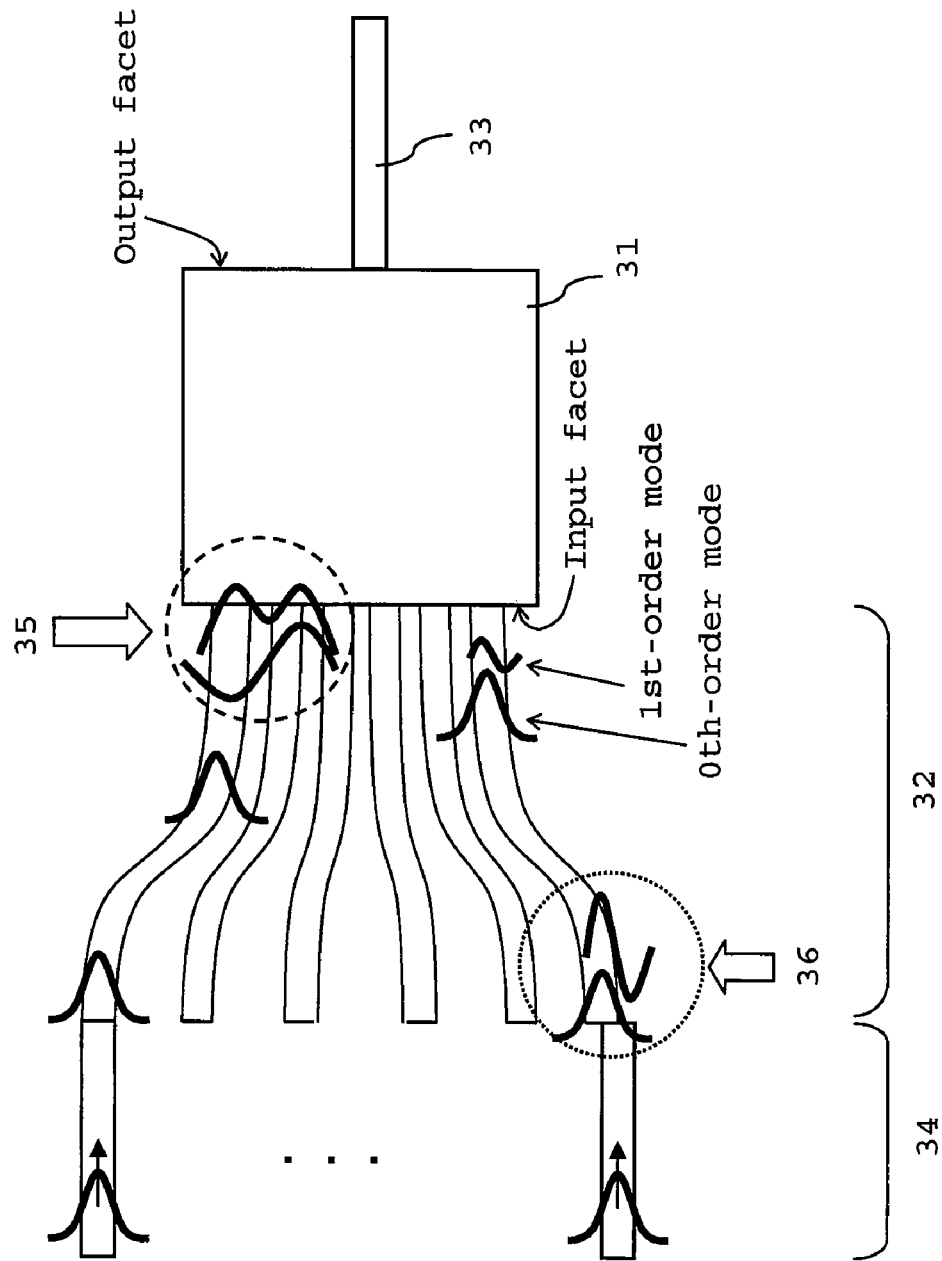
FIG. 11 is a schematic diagram illustrating a mechanism of a conventional optical device in which a 1st-order mode is generated in input light if a rectangular multimode waveguide includes multiple channels.

In the directional coupling section 7, the directional coupling 35, described with reference to FIG. 11, occurs. The directional coupling section 7 is an example of a section in which a distance between the adjacent single mode waveguides is equal to or shorter than a distance at which mode coupling occurs according to the present invention.

In the optical device according to Embodiment 3, the optical path length of the directional coupling section 7 of the input side single-mode waveguide 20 is set as described above. This reduces the effect of the mode coupling between the adjacent input side single-mode waveguides 20.

Description will be given of a mechanism that can reduce the effect of the mode coupling between the adjacent input side single-mode waveguides 20 by setting the optical path length of the directional coupling section 7 of the input side single-mode waveguide 20 as described above.

A gap D between the adjacent ones of the plurality of input side single-mode waveguides 20 connected to the input facet 37 of the rectangular multimode waveguide 1, which has a width W, depends on the W and a channel number N. As miniaturization and integration progress, the W decreases and the N increases to reduce the D. As a result, near the input facet 37 of the rectangular multimode waveguide 1, the adjacent input side single-mode waveguides 20 are subjected to mode coupling. The section in which the mode coupling occurs corresponds to the directional coupling section 7.

Thus, according to a mode coupling theory, the 0th-order mode 5 and the 1st-order mode 6 are generated. As light propagates, interference occurs to cause a maximum quantity of light reciprocates between the adjacent input side single-mode waveguides 20 at a period of a beat length. The beat length corresponds to a case in which the phase difference between the 0th-order mode 5 and the 1st-order mode 6 is $2\pi$. Thus, if the directional coupling section 7 is an integral multiple of the beat length, then at the input facet 37 of the rectangular multimode waveguide 1, the maximum quantity of light resulting from the interference returns to the originating input side single-mode waveguide 20. This substantially avoids the possible effect of mode coupling.

Thus, in the description of Embodiment 3, the optical path length of the directional coupling section 7 is such that the phase difference between the excited 0th-order eigenmode 5 and 1st-order eigenmode 6 is $2\pi$. However, similar effects are exerted provided that the optical path length of the directional coupling section 7 is an integral multiple of a length leading to a phase difference of $2\pi$.

Thus, the 1st-order mode input to the rectangular multimode waveguide can be removed by coupling the input side single-mode waveguides to the input facet of the rectangular multimode waveguide so the input side single-mode waveguides lie in parallel and setting the optical path length of the nearby sections (directional coupling sections) of the adjacent input side single-mode waveguides which are subjected to mode coupling such that the phase difference between the 0th-order eigenmode and the 1st-order eigenmode is $2\pi$. This enables a reduction in the pulse width spread and a variation among the channels, which are caused by the mode group velocity dispersion.

Embodiment 4

Figure 8:
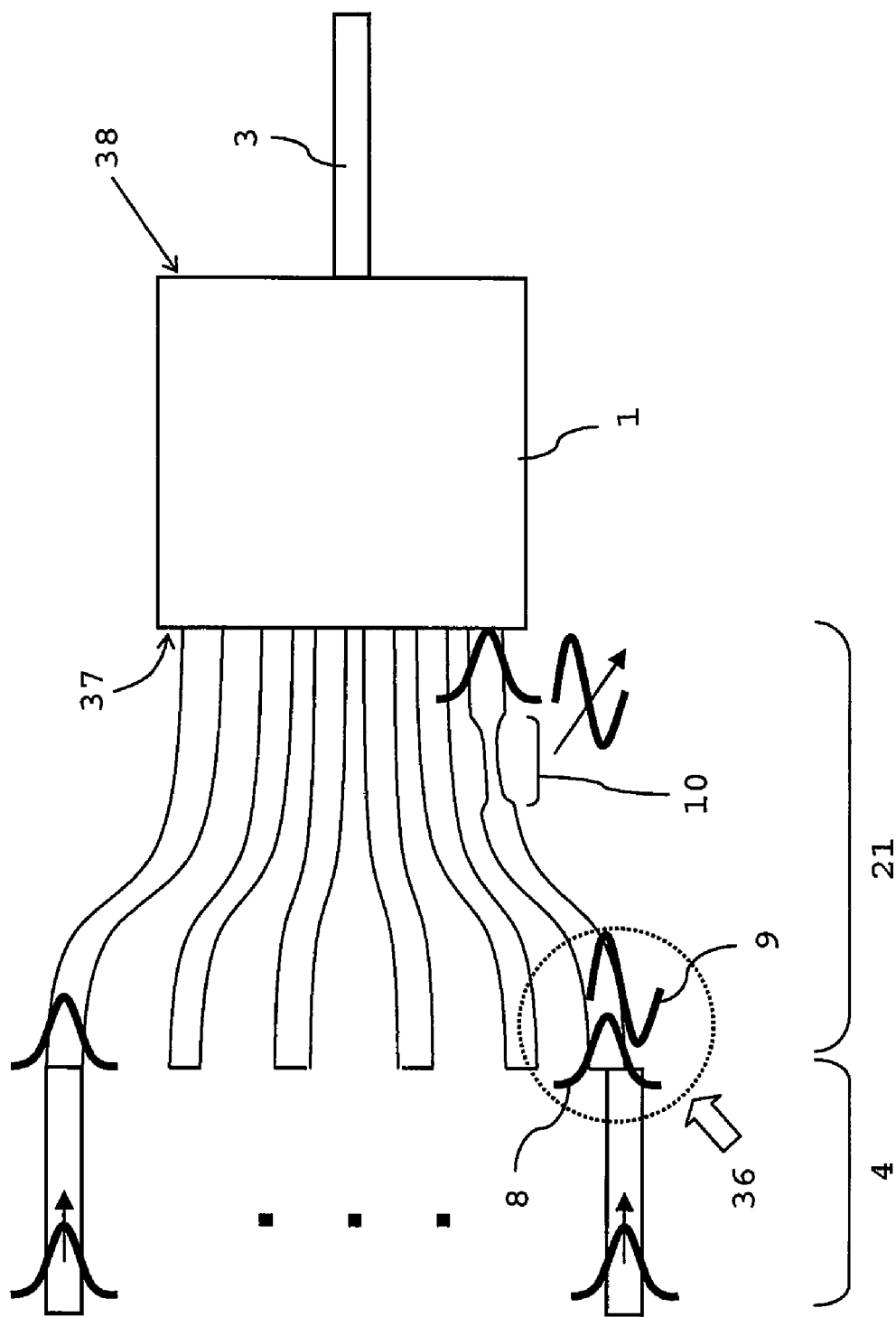
FIG. 8 is a schematic diagram of an optical device according to Embodiment 4 of the present invention.

FIG. 8 shows a schematic diagram of an optical device according to Embodiment 4 of the present invention. The same components as those in FIG. 1(A) are denoted by the same reference numerals.

In the optical device according to Embodiment 4, like the optical device according to Embodiment 1, shown in FIG. 1(A), the plurality of input side single-mode waveguides 21 arranged in parallel so as to correspond to multiple channels are arranged on the input facet 37 of the rectangular multimode waveguide 1 so that the connection positions are arranged on the input facet 37 of the rectangular multimode waveguide 1 in the width direction thereof. The external light source 4 is connected to each of the input side single-mode waveguides 21. The output side single-mode waveguide 3 is connected to the width-wise central position of the output facet 38 of the rectangular multimode waveguide 1.

In the input side single-mode waveguide 21 according to Embodiment 4, as shown in FIG. 8, a narrow portion 10 in which the cross section of the core is narrowed is provided in a part of a section of the input side single-mode waveguide 21 which is a section thereof which is away from the adjacent input side single-mode waveguide 21, that is, not the directional coupling section.

As described with reference to FIG. 11, when light from the external light source 4 enters the input side single-mode waveguide 21 and if the off-axis incidence 36 occurs, the 1st-order mode 9 is generated in addition to the 0th-order mode 8.

The narrow portion 10, provided in the input side single-mode waveguide 21 according to Embodiment 4, is configured to attenuate (radiate) the 1st-order mode 9 resulting from the off-axis incidence 36 of light from the external light source 4 on the input side single-mode waveguide 21.

A decrease in the diameter of the core of the input side single-mode waveguide 21 reduces $\kappa_1 d$ in Formula 2 and thus the value p satisfying Formula 2. That is, the reduced core diameter prevents possible generation of the high-order mode. Consequently, the narrow portion 10 enables attenuation of the 1st-order mode of the light entering the rectangular multimode waveguide 1.

Furthermore, instead of the narrow portion 10, a structure that reduces a difference in refractive index between the core and the clad may be provided in a part of the input side single-mode waveguide to attenuate the 1st-order mode as described above.

Figure 9:
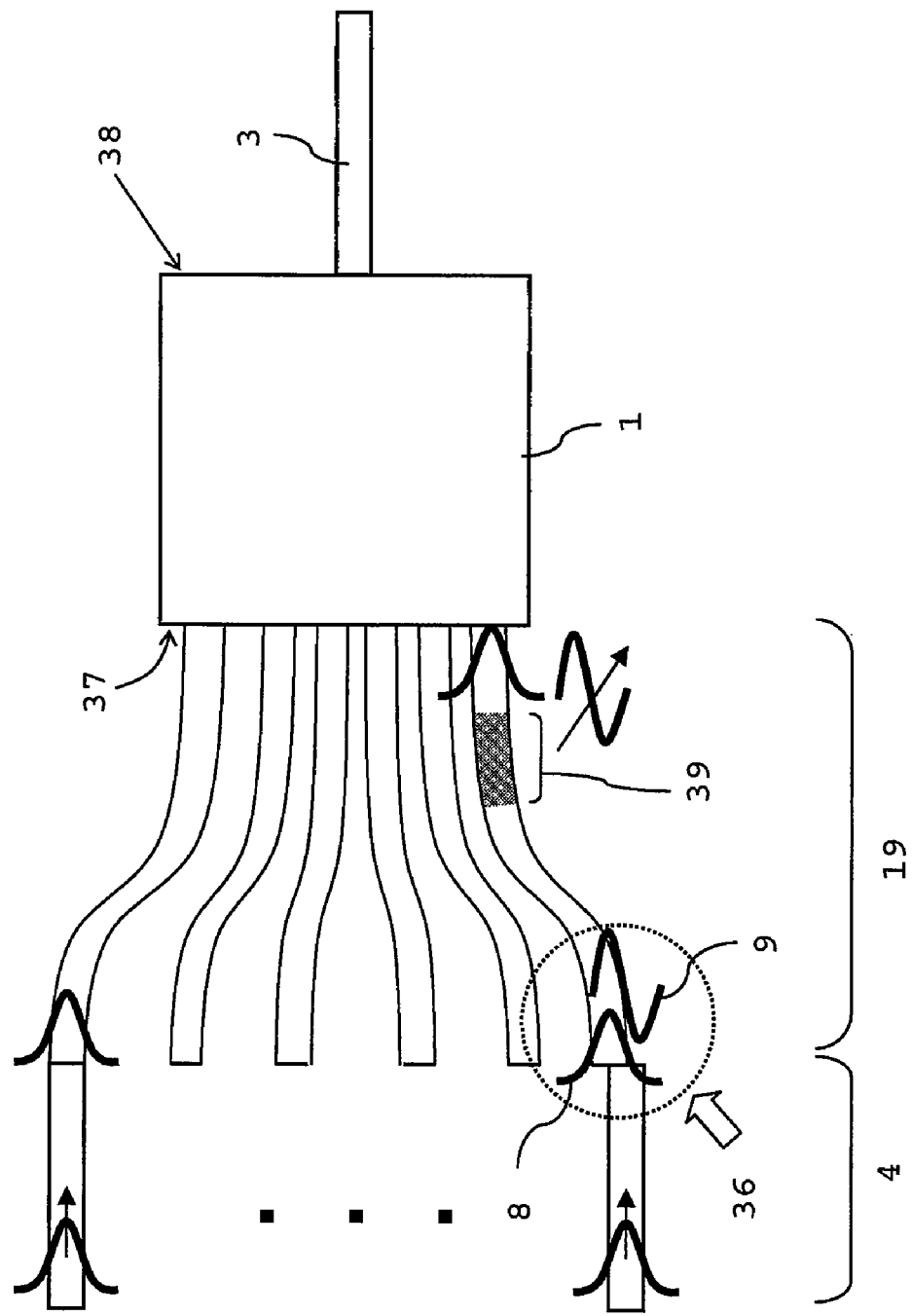
FIG. 9 is a schematic diagram of an optical device of other constitution according to Embodiment 4 of the present invention.

FIG. 9 shows a schematic diagram of an optical device of other constitution according to Embodiment 4 of the present invention. This other constitution has a structure that reduces a difference in refractive index between the core and the clad is provided in a part of the input side single-mode waveguide. The same components as those in FIG. 8 are denoted by the same reference numerals.

In the optical device shown in FIG. 9, like the optical device shown in FIG. 8, the plurality of input side single-mode waveguides 19 arranged in parallel so as to correspond to multiple channels are arranged on the input facet 37 of the rectangular multimode waveguide 1 so that the connection positions are arranged on the input facet 37 of the rectangular multimode waveguide 1 in the width direction thereof. In the input side single-mode waveguide 19, a portion of small difference in refractive index 39 in which the difference in refractive index between the core and the clad is smaller than that in the other portion, is shaped in a part thereof which is away from the adjacent input side single-mode waveguide 21, that is, not the directional coupling section.

The reduced difference in refractive index between the core and the clad reduces the right side of Formula 1 and the $\kappa_1 d$ in Formula 2, and thus the value p satisfying Formula 2. Consequently, when the portion with the reduced difference in refractive index between the core and the clad is provided in the input side single-mode waveguide 21, the 1st-order mode of light entering the rectangular multimode waveguide 1 can also be attenuated.

Thus, the cross section of the core is narrowed or the difference in refractive index between the core and the clad is reduced, in a part of the input side single-mode waveguide. Then, the 1st-order mode resulting from the off-axis coupling to the light source can be attenuated (radiated) in the input side single-mode waveguide to remove the 1st-order mode input to the rectangular multimode waveguide. This enables a reduction in the pulse width spread and the variation among the channels, which are caused by the mode group velocity dispersion.

Each of the narrow portion 10 in FIG. 8 and the portion of small difference in refractive index 39 in FIG. 9 corresponds to an example of a section in which light having the 1st-order eigenmode is attenuated according to the present invention.

As described above, according to the present invention, the optical device utilizing the self imaging phenomenon of the MMI enables external absorption of the high-order mode, which causes the MMI and involves the significant penetration from the core of the rectangular multimode waveguide as well as the profound mode group delay. This enables a reduction in the pulse width spread, which is caused by the mode group velocity dispersion and which may limit transmission rate. Furthermore, reducing the 1st-order component input to the rectangular multimode waveguide enables a reduction in the pulse width spread and variation, which result from asymmetry with respect to the input position.

Therefore, the use of the optical device according to the present invention enables the transmission rate to be improved in spite of integration. The present invention can thus realize an optical device that can prevent the transmission rate from being reduced in spite of integration.

As described above, the optical devices according to Embodiment 1 and 2 remove the unnecessary high-order modes for coupling are generated in the rectangular multimode waveguide. The optical devices according to Embodiment 3 and 4 attenuate the unnecessary 1st-order mode is generated on the input side single-mode waveguide before inputting into the rectangular multimode waveguide. Therefore the optical device according to Embodiment 1 or 2 is combined with the input side single-mode waveguide which has the constitution according to Embodiment 3 or 4, more significant effects are exerted.

Embodiment 5

The applied example of an optical device according to the present invention will be described.

FIGS. 10(A) and (B) show constitution diagrams of an integrated circuit such as LSI or MPU comprising the optical circuit according to the present invention. FIG. 10(A) shows a top view of the integrated circuit, and FIG. 10(B) shows a sectional view of the side of it.

As for the integrated circuit conventionally, the chip inside consists of it by electric wiring circuits generally. Such as to supply clock signal to synchronize of each local wiring that occurred with tininess of the wiring is controlled by global wiring. The delay and the consumption electricity increase depending on the increase of the wiring length of the global wiring had become a problem recently. To use optical lines are demanded as the global wiring part.

There are an electrical line portion 42 as the global layer and an optical line portion 41 as the local layer supplying the clock signal by light, in the inside of the LSI 40 shown in FIGS. 10(A) and 10(B). In the inside of the LSI 40, there is any optical device according to Embodiment 1 to 4 as an optical coupler to divide the clock signal by light for the global layer 41.

The optical device according to the present invention enables the transmission rate to be improved in spite of integration. Then the optical device according to the present invention is suitable very much as an optical device that use to supply the clock signal by light, to be demanded synchronizing and decreasing skew, such as inside of LSI 40.

The optical device, an optical coupler and an integrated circuit according to the present invention are effective for reducing the pulse width spread caused by the mode group delay dispersion in spite of multiple channels and the reduced size of the device. The present invention is thus useful as, for example, an optical device used for an optical circuit or an optical coupler, an optical coupler and an integrated circuit which utilize multimode interference.

What is claimed is:

1. An optical device comprising:
   a rectangular multimode waveguide; and
   an electromagnetic wave absorber for absorbing a light source wavelength received from the rectangular multimode waveguide such that the light source wavelength is attenuated, which is located on at least one of side surfaces of the rectangular multimode waveguide, said side surfaces being perpendicular to both an input surface and an output surface of the rectangular multimode waveguide, and is located at a predetermined gap from a core of the rectangular multimode waveguide and parallel to the rectangular multimode waveguide, wherein the rectangular multimode waveguide has the core and a clad provided on the core, the electromagnetic wave absorber is provided on a surface of the clad, and the predetermined gap is a thickness of the clad.

2. The optical device according to claim 1, wherein the predetermined gap is longer than an effective depth of penetration of the core field into the cladding, from the core, of a light having a first predetermined order of eigenmode and is shorter than the effective depth of penetration of the core field into the cladding, from the core, of a light having a second predetermined order of eigenmode, the second predetermined order being larger than the first predetermined order by one.

3. The optical device according to claim 2, wherein the second predetermined order is an order of eigenmode of such light which is to be absorbed.

4. The optical device according to claim 1, wherein the electromagnetic wave absorber is aluminum, and the predetermined gap is 2.2% of the width direction length of the input edge of the core of the rectangular multimode waveguide.

5. An optical device comprising:

a rectangular multimode waveguide; and an electromagnetic wave absorber for absorbing a light source wavelength received from the rectangular multimode waveguide such that the light source wavelength is attenuated, which is located on at least one of side surfaces of the rectangular multimode waveguide, said side surfaces being perpendicular to both an input surface and an output surface of the rectangular multimode waveguide, and is located at a predetermined gap from a core of the rectangular multimode waveguide and parallel to the rectangular multimode waveguide, wherein each connection portion of a plurality of single mode waveguides is connected to an input edge of the core of the rectangular multimode waveguide in a width direction thereof.

* * * * *